US009636608B2

(12) United States Patent
Morris et al.

(10) Patent No.: US 9,636,608 B2
(45) Date of Patent: May 2, 2017

(54) FILTER ELEMENT HAVING END CAP SEAL AND FILTER ASSEMBLY

(71) Applicant: Caterpillar Inc., Peoria, IL (US)

(72) Inventors: Bryant A. Morris, Peoria, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 434 days.

(21) Appl. No.: 14/163,641

(22) Filed: Jan. 24, 2014

(65) Prior Publication Data

US 2015/0209699 A1 Jul. 30, 2015

(51) Int. Cl.
| | |
|---|---|
| *B01D 29/13* | (2006.01) |
| *B01D 35/30* | (2006.01) |
| *B01D 29/88* | (2006.01) |
| *F16N 39/06* | (2006.01) |
| *B01D 29/11* | (2006.01) |
| *B01D 36/00* | (2006.01) |
| *B01D 29/56* | (2006.01) |
| *B01D 29/90* | (2006.01) |

(52) U.S. Cl.
CPC .............. *B01D 29/13* (2013.01); *B01D 29/11* (2013.01); *B01D 29/885* (2013.01); *B01D 35/306* (2013.01); *F16N 39/06* (2013.01); *B01D 29/56* (2013.01); *B01D 29/90* (2013.01); *B01D 36/001* (2013.01); *B01D 2201/0415* (2013.01); *B01D 2201/291* (2013.01); *B01D 2201/304* (2013.01); *B01D 2201/40* (2013.01)

(58) Field of Classification Search
CPC .... B01D 29/13; B01D 29/885; B01D 35/306; B01D 29/11; B01D 2201/0415; B01D 29/56; B01D 29/90; B01D 2201/304; B01D 36/001; B01D 2201/291; B01D 2201/40; F16N 39/06
USPC ..... 210/450, 493.2, 440, 443, 437, 438, 457
See application file for complete search history.

(56) References Cited

U.S. PATENT DOCUMENTS

| | | | |
|---|---|---|---|
| 6,896,803 | B2 | 5/2005 | Cline et al. |
| 8,241,493 | B2 | 8/2012 | Beard et al. |
| 8,419,938 | B2 | 4/2013 | Ries et al. |
| 2003/0226790 | A1* | 12/2003 | Brown ............. C10M 175/0091 210/90 |
| 2005/0178716 | A1 | 8/2005 | Suri |

(Continued)

FOREIGN PATENT DOCUMENTS

EP 2151269 2/2010

*Primary Examiner* — Madeline Gonzalez
(74) *Attorney, Agent, or Firm* — Finnegan, Henderson, Farabow, Garrett & Dunner, LLP (57) ABSTRACT

A filter element may include a tubular member including an end portion at least partially defining an inlet port configured to provide flow communication to a filter medium of the filter element, and at least partially defining an outlet port configured to provide flow communication from the filter medium. The filter element may further include a filter medium associated with the tubular element, and an end cap associated with the end portion of the tubular member and the filter medium. The end cap may include a plate transverse to the longitudinal axis of the tubular member, and a sealing wall coupled to the plate and extending transverse to the plate. The sealing wall may include a seal portion configured to be compressed between a filter canister and a portion of a filter base to provide a seal between the filter canister and the portion of the filter base.

20 Claims, 7 Drawing Sheets

(56) References Cited

U.S. PATENT DOCUMENTS

2009/0308802 A1* 12/2009 Beard .................. B01D 29/21
                                                    210/238
2013/0248464 A1  9/2013 Schweitzer

* cited by examiner

FILTER ELEMENT HAVING END CAP SEAL AND FILTER ASSEMBLY

TECHNICAL FIELD

The present disclosure relates to a filter element and a filter assembly including the filter element, and more particularly, to a filter element having an end cap seal and a filter assembly including the filter element

BACKGROUND

Filter systems may be used to filter fluids associated with operation of a machine such as an internal combustion engine. For example, filter systems may be used to remove particles from fuel and lubricant. In order to prevent fluid from leaking from a filter system, one or more seals may be provided between a canister and filter base of the filter system to provide a fluid-tight seal between the canister and filter base. However, depending on the configuration of the components of the filter system, it may be difficult to provide a sufficiently fluid-tight seal. In addition, some filter systems have a separate seal that must be installed when assembling the components of the filter system. In such filter systems, it may be possible to service the filter system and unintentionally fail to include the seal when reassembling the filter system. As a result, it may be desirable to provide a filter system that has a sufficient fluid seal. It may also be desirable to provide an filter system that substantially prevents assembly of the filter system without including a seal.

A seal for a filter system is described in U.S. Pat. No. 8,241,493 B2 ("the '493 patent") issued to Beard et al. on Aug. 14, 2012. Specifically, the '493 patent discloses a filter assembly including an end cap sealingly connected to a top end of a tubular ring of filter media. To prevent fluid from escaping the filter assembly, a gasket is mounted to the end cap and provides a seal between the end cap and a housing of the filter assembly.

Although the end cap and gasket of the '493 patent may provide a seal for the filter assembly of the '493 patent, it may not provide a sufficient seal for some filter assemblies. In addition, because the gasket is separate from the end cap, it may be possible to unintentionally fail to install the gasket upon assembly of the filter assembly, resulting in leakage of fluid from the filter assembly upon operation of the fluid system.

The filter element and filter assembly disclosed herein may be directed to mitigating or overcoming one or more of the possible drawbacks set forth above.

SUMMARY

In one aspect, the present disclosure is directed to a filter element. The filter element may include a tubular member having a longitudinal axis. The tubular member may include an end portion at least partially defining an inlet port configured to provide flow communication to a filter medium of the filter element, and at least partially defining an outlet port configured to provide flow communication from the filter medium. The filter element may further include a filter medium associated with the tubular element and configured to filter particles from fluid passing through the filter medium, and an end cap associated with the end portion of the tubular member and the filter medium. The end cap may include a plate transverse to the longitudinal axis of the tubular member, with the plate having an end cap aperture through which the end portion of the tubular member is received. The end cap may further include a sealing wall coupled to the plate and extending transverse to the plate, with the sealing wall including a seal portion configured to be compressed between a filter canister and a portion of a filter base to provide a seal between the filter canister and the portion of the filter base. The filter element may be configured such that fluid passing through the filter element from the inlet port to the outlet port passes through the filter medium.

According to a further aspect, a filter element may include a tubular member having a longitudinal axis. The tubular member may include an end portion at least partially defining an inlet port configured to provide flow communication to a filter medium of the filter element, and at least partially defining an outlet port configured to provide flow communication from the filter medium. The filter element may further include a filter medium associated with the tubular element and configured to filter particles from fluid passing through the filter medium, and an end cap associated with the end portion of the tubular member and the filter medium. The end cap may include a plate transverse to the longitudinal axis of the tubular member, with the plate having an end cap aperture through which the end portion of the tubular member is received. The end cap may further include a sealing wall coupled to the plate and extending transverse to the plate, with the sealing wall including a seal portion configured to be compressed between a filter canister and a portion of a filter base in a direction transverse to the longitudinal axis of the tubular member to provide a seal between the filter canister and the portion of the filter base. The filter element may be configured such that fluid passing through the filter element from the inlet port to the outlet port passes through the filter medium.

According to still a further aspect, a filter assembly may include a filter base configured to be coupled to a machine, and a filter canister having an open end, a closed end, and being configured to be coupled to the filter base. The filter assembly may further include a filter element configured to be received in the canister. The filter element may include a tubular member having a longitudinal axis and including an end portion at least partially defining an inlet port configured to provide flow communication to a filter medium of the filter element, and at least partially defining an outlet port configured to provide flow communication from the filter medium. The filter element may further include a filter medium associated with the tubular element and configured to filter particles from fluid passing through the filter medium, and an end cap associated with the end portion of the tubular member and the filter medium. The end cap may include a plate transverse to the longitudinal axis of the tubular member, with the plate having an end cap aperture through which the end portion of the tubular member is received. The end cap may further include a sealing wall coupled to the plate and extending transverse to the plate, with the sealing wall including a seal portion configured to be compressed between the filter canister and a portion of the filter base to provide a seal between the filter canister and the portion of the filter base. The filter element may be configured such that fluid passing through the filter element from the inlet port to the outlet port passes through the filter medium.

DETAILED DESCRIPTION

Figure 1:
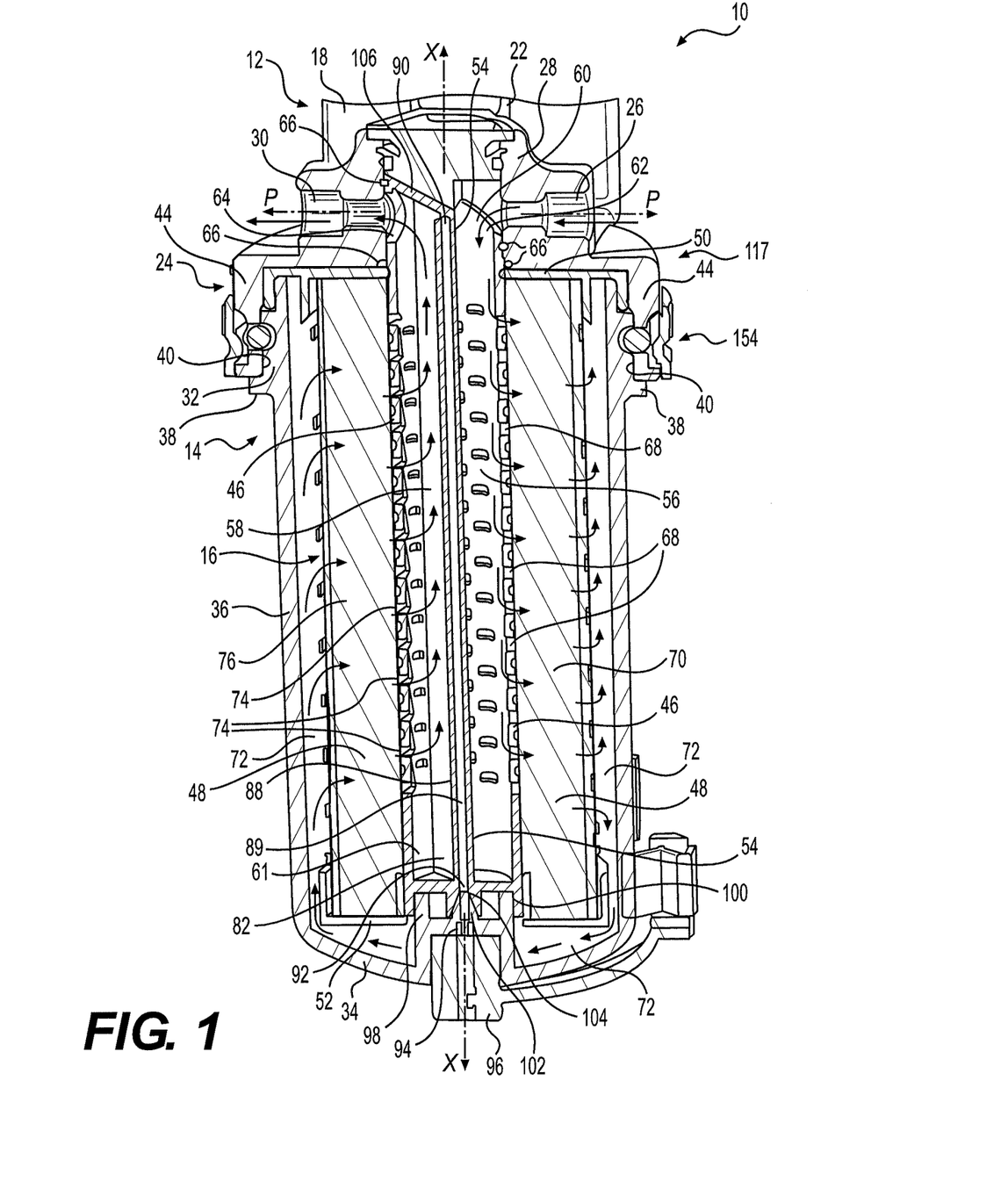
FIG. 1 is a perspective section view of an exemplary embodiment of a filter assembly.

FIG. 1 illustrates an exemplary embodiment of a filter assembly 10. Filter assembly 10 may be used to filter fluids such as, for example, fuel, lubricants, coolants, and hydraulic fluid used by machines. According to some embodiments, filter assembly 10 may be used as a fuel/water separator filter and/or as an air filter. Other uses may be contemplated.

Exemplary filter assembly 10 shown in FIG. 1 includes a filter base 12 configured to couple filter assembly 10 to a machine, a canister 14 configured to be coupled to filter base 12, and a filter element 16 configured to be received in canister 14. Exemplary filter base 12 includes a mounting bracket 18 having at least one hole 20 (e.g., two holes 20) for receiving a fastener for coupling filter base 12 to a machine. Other coupling configurations are contemplated. Exemplary filter base 12 also includes an extension 22 and a canister coupler 24 configured to be coupled to canister 14. Extension 22 serves to space canister coupler 24 from mounting bracket 18 to provide clearance for canister 14.

Figure 2:
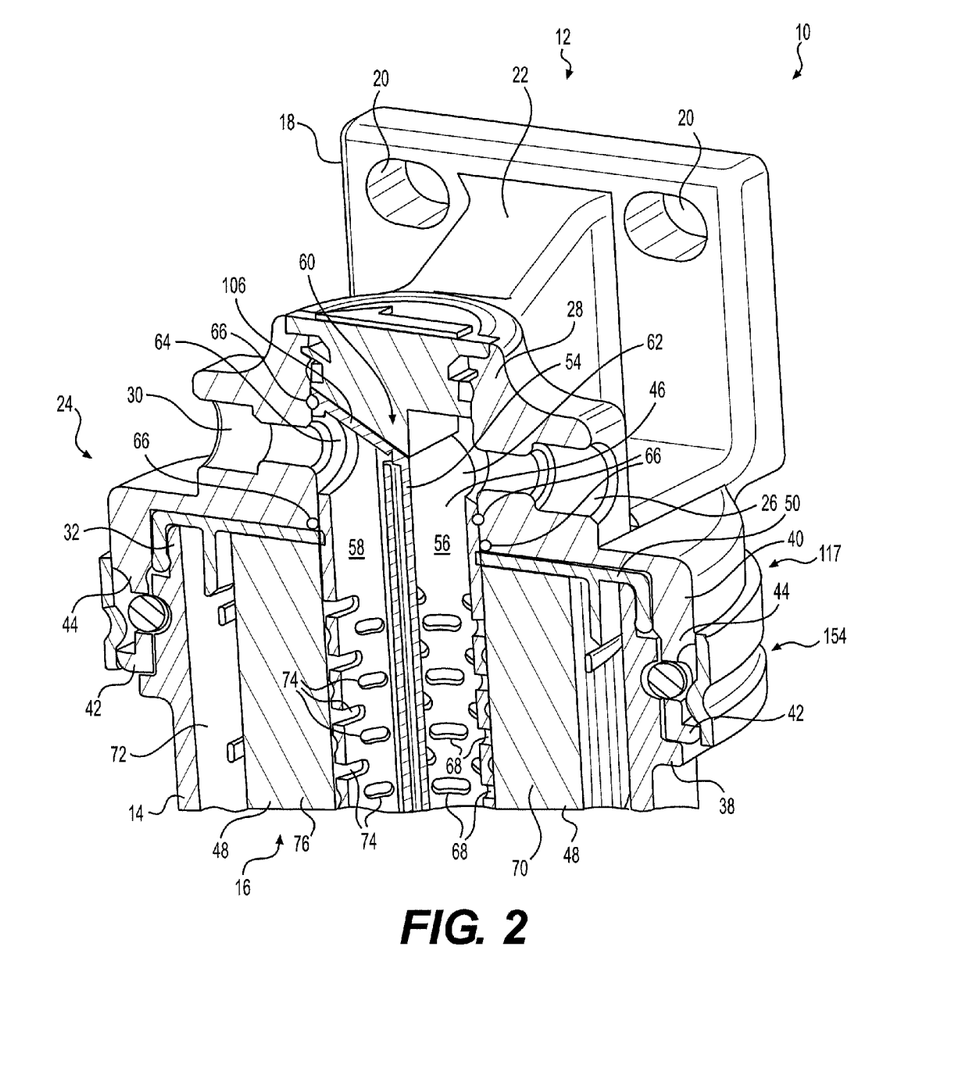
FIG. 2 is a partial perspective section view of the exemplary filter assembly shown in FIG. 1.

As shown in FIGS. 1 and 2, exemplary canister coupler 24 of filter base 12 includes an inlet passage 26, a receiver 28, and an outlet passage 30. Exemplary inlet passage 26 is configured to be coupled to a fluid conduit of a fluid system, such as, for example, a fuel system, a lubrication system, a hydraulic system, or a coolant system, such that it receives fluid for filtration in filter assembly 10. Exemplary receiver 28 is configured to receive a portion of filter element 16, as explained in more detail herein. Exemplary outlet passage 30 is configured to be coupled to a fluid conduit of the fluid system, such that fluid exiting filter assembly 10 returns to the fluid system following filtration. As explained in more detail herein, the roles of inlet passage 26 and outlet passage 30 may be reversed, such that outlet passage 30 is coupled to a fluid conduit and receives fluid for filtration in filter assembly 10, and inlet passage 26 is configured to be coupled to a fluid conduit, such that fluid exiting filter assembly 10 returns to the fluid system following filtration via inlet passage 26.

Exemplary canister 14 shown in FIG. 1 includes an open end 32, an oppositely-disposed closed end 34, and a body portion 36 extending therebetween. Canister 14 includes a mounting flange 38 adjacent open end 32. As shown in FIGS. 1 and 2, open end 32 of canister 14 is received in an open-ended housing 40 of filter base 12, with mounting flange 38 abutting an end 42 of a base wall 44 of housing 40. As explained in more detail herein with respect to FIG. 12, one or more seals may be provided between open end 32 of canister 14 and housing 40 to provide a fluid-tight barrier between canister 14 and housing 40 (e.g., between open end 32 and base wall 44). Further, engagement structures such as those explained herein may be provided to secure canister 14 to filter base 12.

Exemplary canister 14 and housing 40 may define respective cross-sections. For example, canister 14 and housing 40 may define respective cross-sections that are substantially circular, substantially oval-shaped, and/or substantially polygonal. According to some embodiments, the cross-sections may be substantially constant along the longitudinal length of canister 14 (e.g., as shown in FIG. 1). According to some embodiments, the cross-sections may be vary along the longitudinal length of canister 14. The cross-sections may be chosen based on various considerations, such as, for example, the size and shape of the available space at a location of a machine that receives filter assembly 10.

As shown in FIG. 1, exemplary filter element 16 is received in canister 14 and cooperates with filter base 12 and canister 14, such that particles in fluid received in inlet passage 26 of filter base 14 are filtered by filter element 16, and the filtered fluid exits outlet passage 30 of filter base 14 following filtration. According to some embodiments, filter element 16 is configured such that fluid passing through filter element 16 from inlet passage 26 of filter base 12 to outlet passage 30 of filter base 12 is subjected to two filtration processes.

As shown in FIGS. 1 and 3-9, exemplary filter element 14 includes a tubular member 46 substantially surrounded by a filter medium 48. Filter medium 48 may include any filter medium type known to those skilled in the art, such as, for example, foam-type, screen-type, paper-type, and combinations thereof. Some embodiments of filter element 14 include a first end cap 50 coupled at a longitudinal end of tubular member 46 at an end configured to be adjacent filter base 12 upon installation, and a second end cap 52 coupled at a longitudinal end of tubular member 46 opposite first end cap 50.

In the exemplary embodiment shown in FIGS. 1 and 3-9, tubular member 46 of filter element 16 defines a longitudinal axis X and includes a partition 54 at least partially defining a first chamber 56 and at least partially defining a second chamber 58. As shown, exemplary partition 54 extends longitudinally within tubular member 46 and prevents flow communication between first chamber 56 and second chamber 58 within tubular member 46. Tubular member 46 includes a first end portion 60 at a first longitudinal end of tubular member 46 and a second end portion 61 at a second, opposite longitudinal end of tubular member 46. Exemplary first end portion 60 at least partially defines an inlet port 62 and at least partially defines an outlet port 64. For example, for embodiments in which tubular member 46 has a substantially circular cross-section, inlet port 62 may be located circumferentially opposite outlet port 64.

As shown in FIGS. 1 and 2, exemplary end portion 60 is received in receiver 28 of filter base 12. One or more seals 66, such as, for example, O-ring seals shown in FIGS. 1, 2, and 3-7 may be provided to create a fluid-tight seal between end portion 60 of tubular member 46 and filter base 12. Exemplary inlet port 62 provides flow communication between inlet passage 26 of filter base 14 and first chamber 56 of tubular member 46. Exemplary outlet port 64 provides flow communication between second chamber 58 of tubular member 46 and outlet passage 30 of filter base 14. In the exemplary embodiment shown, inlet passage 26 and inlet port 62 provide the only fluid entry point for fluid entering filter element 16, and outlet port 64 and outlet passage 30 provide the only fluid exit point for fluid exiting filter element 16.

Figure 8:
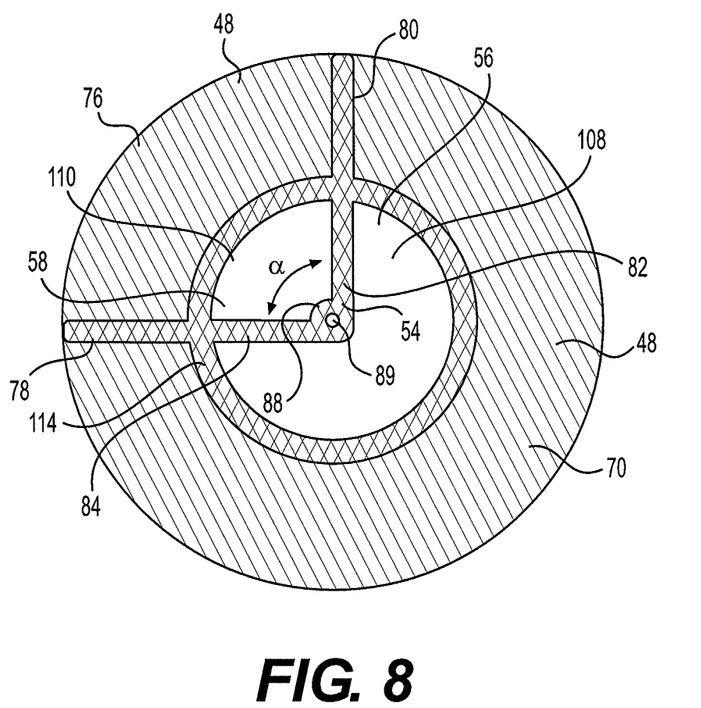
FIG. 8 is section view of the exemplary portion shown in FIG. 5.
Figure 9:
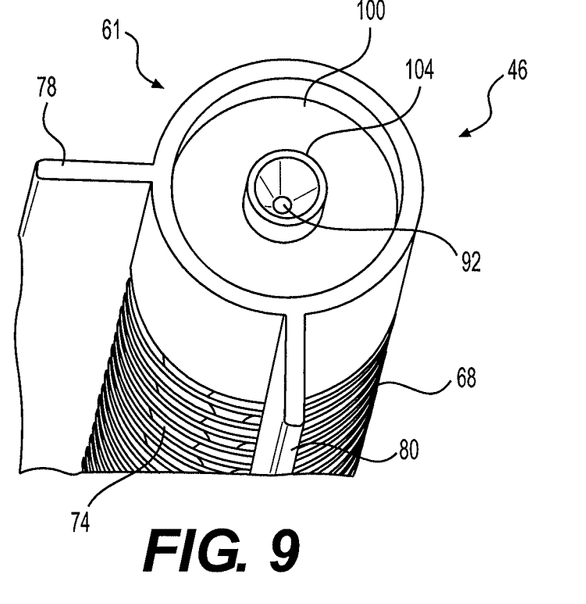
FIG. 9 is a partial perspective end view of the exemplary portion shown in FIG. 5.

As shown in FIGS. 1, 2, 5, and 6, exemplary tubular member 46 includes at least one outlet aperture 68 (e.g., a plurality of outlet apertures 68 as shown) configured to provide flow communication out of first chamber 56, through a first portion 70 of filter medium 48, and into an interior space 72 of canister 14. Exemplary tubular member 46 also includes at least one inlet aperture 74 (e.g., a plurality of inlet apertures 74 as shown) configured to provide flow communication from interior space 72 of canister 14, through a second portion 76 of filter medium 48, and into second chamber 58 of tubular member 46. As shown in FIG. 8, first portion 70 of filter medium 48 is associated with outlet apertures 68, and second portion 76 of filter medium 48 is associated with inlet apertures 74. In particular, first portion 70 is located exterior and adjacent to outlet apertures 68, such that fluid flowing from first chamber 56 into interior space 72 of canister 40 passes through first portion 70, thereby filtering the fluid passing through outlet apertures 68. Second portion 76 is located exterior and adjacent to inlet apertures 74, such that fluid flowing from interior space 72 of canister 40 into second chamber 58 passes through second portion 76, thereby filtering the fluid passing through inlet apertures 74.

As shown in FIG. 1, exemplary filter assembly 10 is configured such that fluid passing through the filter element 16 enters filter assembly 10 via inlet passage 26 of filter base 12. Fluid flows from inlet passage 26 into inlet port 62 of end portion 60 and into first chamber 56. Thereafter, fluid flows out of at least one outlet aperture 68, through first portion 70 of filter medium 48, and into interior space 72 of canister 14. Passing through first portion 70 of filter medium 48 results in the fluid being subjected to a first filtration process. Once in interior space 72 of canister 40 following the first filtration process, the fluid is able to flow around filter element 16 within canister 40 and enter second chamber 58 of tubular member 46. For example, fluid may flow circumferentially around exemplary filter element 16 and/or between second end cap 52 and closed end 34 of canister 14 to second portion 76 of filter medium 48. Thereafter, the fluid passes through second portion 76 of filter medium 48, through at least one inlet aperture 74, and into second chamber 58. Passing through second portion 76 of filter medium 48 results in the fluid being subjected to a second filtration process. Thereafter, the fluid flows from second chamber 58 via tubular member 46 to outlet port 64, and exits filter element 16 via outlet passage 30 of filter base 12. Thus, in this exemplary embodiment, fluid passing through filter element 16 from inlet port 62 to outlet port 64 passes through both first chamber 56 and second chamber 58, for example, such that the fluid passing through filter element 16 from inlet port 62 to outlet port 64 passes through both first portion 70 of filter medium 48 and second portion 76 of filter medium 48. In this exemplary manner, fluid entering filter assembly 10 is subjected to two filtration processes within a single filter assembly including a single canister and a single filter element.

As shown in FIGS. 5-9, exemplary tubular member 46 includes at least a first barrier 78 and a second barrier 80 extending radially from the exterior surface of tubular member 46. As shown in FIG. 8, first portion 70 of filter medium 48 extends between first barrier 78 and second barrier 80 in association with first chamber 56. Second portion 76 of filter medium 48 extends between first barrier 78 and second barrier 80 in association with second chamber 58. First barrier 78 and second barrier 80 serve to prevent fluid exiting outlet apertures 68 from entering inlet apertures 74 without first passing through the entire thickness of first portion 70 and the entire thickness of second portion 76 of filter medium 48.

According to some embodiments, first barrier 78 and/or second barrier 80 may be substantially planar, for example, as shown in FIGS. 5-9. According to some embodiments, first barrier 78 and/or second barrier 80 may be curved. According to some embodiments, first barrier 78 and/or second barrier 80 may have a length such that respective ends of the barriers are substantially flush with an exterior surface of filter medium 48, for example, as shown in FIG. 8. According to some embodiments, first barrier 78 and/or second barrier 80 may have a length such that respective ends of the barriers extend beyond the exterior surface of filter medium 48. According to some embodiments, first barrier 78 and/or second barrier 80 may have a length such that respective ends of the barriers do not reach the exterior surface of filter medium 48.

In the exemplary embodiment shown, tubular member 46 has a substantially circular cross-section. According to some embodiments, tubular member 46 may have other cross-sections, such as, for example, substantially oval-shaped and substantially polygonal. According to some embodiments, the cross-sectional shape of tubular member 46 may be substantially constant along its longitudinal length, for example, as shown. According to some embodiments, the cross-section of tubular member 46 may be vary along its longitudinal length. The cross-section may be chosen based on various considerations, such as, for example, the size and shape of the available space at a location of a machine that receives filter assembly 10.

Figure 6:
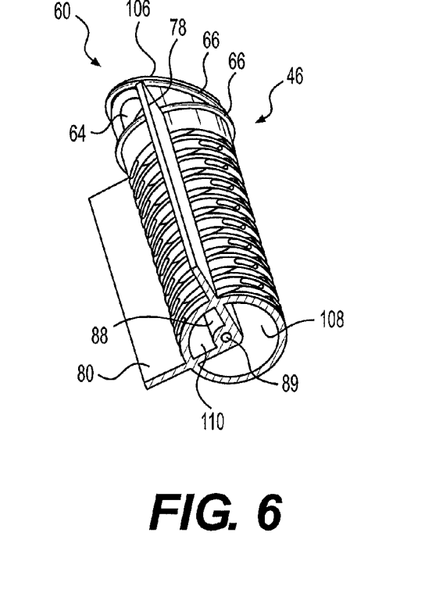
FIG. 6 is a partial perspective section view of the exemplary portion of the exemplary filter element shown in FIG. 5.
Figure 7:
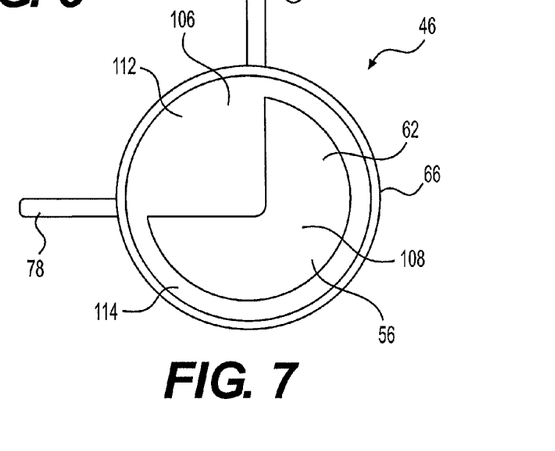
FIG. 7 is an end view of the exemplary portion shown in FIG. 5.

As shown in FIGS. 6 and 8, partition 54 of tubular member 46 may be curved or include a number of segments joined to one another. For example, exemplary partition 54 includes a first segment 82 joined to a second segment 84, with first segment 82 and second segment 84 meeting an angle $\alpha$ with respect to each other. For example, angle $\alpha$ may range from about 20 degrees to about 180 degrees, from about 30 degrees to about 150 degrees, from about 40 to about 120 degrees, from about 60 degrees to about 110 degrees, or from about 70 degrees to about 100 degrees (e.g., about 90 degrees). Angle $\alpha$ may be selected based on various considerations, such as, for example, the desired level of difference in filtration provided by first portion 70 of filter medium 48 and second portion 76 of filter medium 48.

According to some embodiments, the filter medium of first portion 70 may have the same filtering characteristics as the filter medium of second portion 76. According to some embodiments, the filter medium of first portion 70 may have different filtering characteristics than the filter medium of second portion 76. According to some embodiments, first portion 70 and second portion 76 of filter medium 48 may have the same thickness, a different thickness, and/or a different length (e.g., a different circumferential length).

As shown in FIGS. 6 and 8, exemplary first barrier 78 and second barrier 80 form extensions of partition 54 by being coupled to the exterior surface of tubular member 46 at the same circumferential locations as the points at which the ends of partition 54 are coupled to the interior surface of tubular member 46. According to some embodiments, first barrier 78 and second barrier 80 are coupled to the exterior surface of tubular member 46 at circumferential locations different from the points at which the ends of partition 54 are coupled to the interior surface of tubular member 46.

Figure 3:
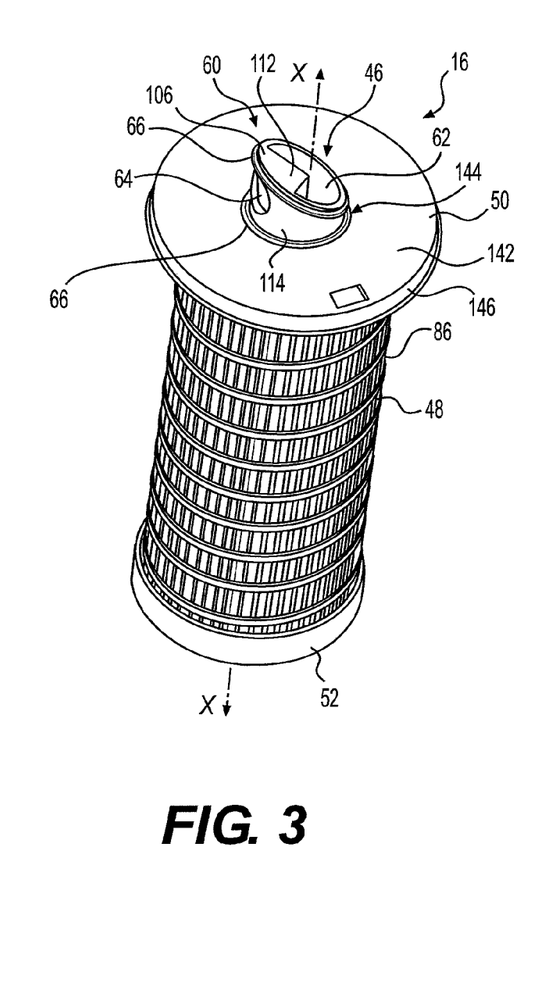
FIG. 3 is a perspective view of an exemplary embodiment of a filter element.
Figure 4:
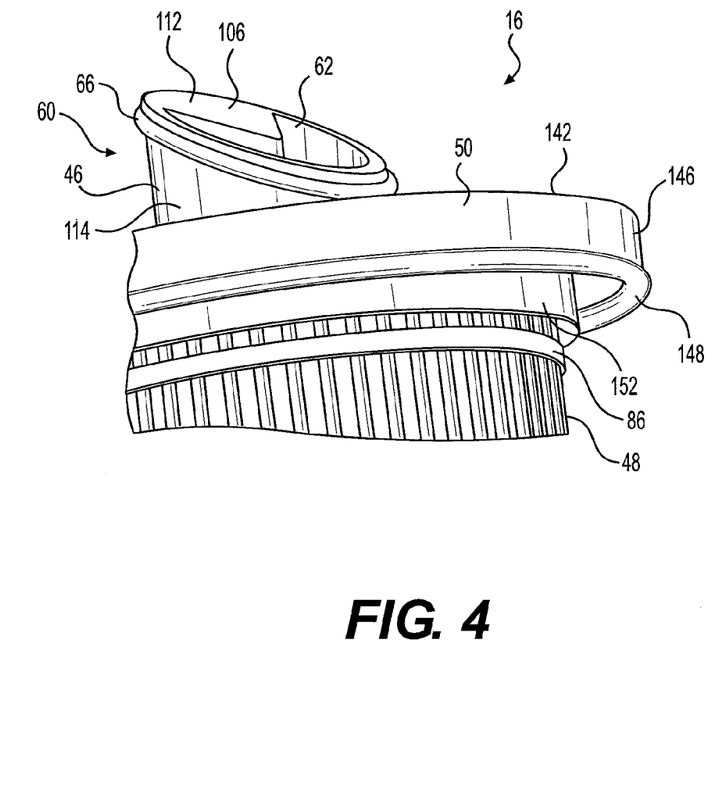
FIG. 4 is a partial perspective view of the exemplary filter element shown in FIG. 3.
Figure 5:
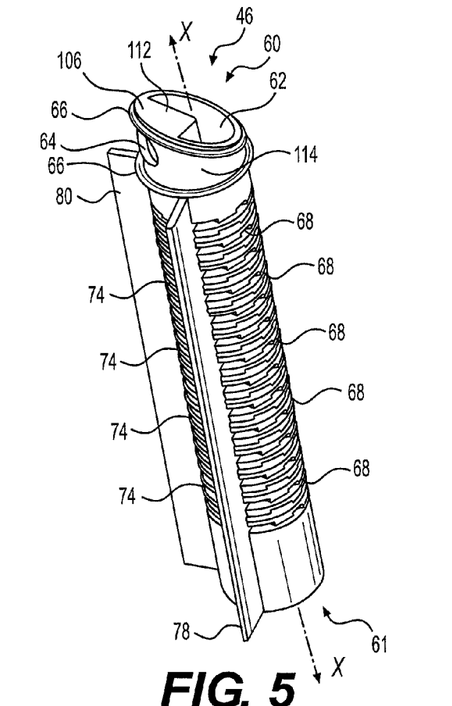
FIG. 5 is a perspective view of an exemplary embodiment of a portion of an exemplary filter element.

As shown in FIGS. 3 and 4, exemplary filter element 16 includes a spirally-wound roving 86 configured to secure filter medium 48 against tubular member 46. For example, roving 86 may serve to hold both first portion 70 and second portion 76 of filter medium 48 against tubular member 46. Although the exemplary embodiment shown in FIGS. 3 and 4 includes spirally-wound roving 86, alternative ways to couple filter medium 48 to tubular member 46 are contemplated.

Referring to FIGS. 1, 2, 6, 8, 10, and 11, tubular member 46 of filter element 16 may include a vent tube 88 defining a vent passage 89 configured to provide flow communication between first end portion 60 and second end portion 61 of tubular member 46. For example, exemplary vent tube 88 extends longitudinally between first end portion 60 and second end portion 61, defining a first end aperture 90 at first end portion 60 and a second end aperture 92 and second end portion 61.

In the exemplary embodiments shown, vent tube 88 is associated with partition 54 and extends in second chamber 58 of tubular member 46. In this exemplary configuration, flow communication is substantially prevented between first chamber 56 and vent tube 88 without passing through second chamber 58. Although shown extending in second chamber 58, vent tube 88 may alternatively extend in first chamber 56, and in this alternative configuration flow communication is substantially prevented between second chamber 58 and vent tube 88 without passing through first chamber 56.

As shown in FIG. 1, closed end 34 of exemplary canister 14 defines a drain aperture 94 configured to receive a drain plug 96. Drain aperture 94 and drain plug 96 may be configured to disengage from one another, such that fluid may be drained from filter assembly 10. For example, drain aperture 94 and drain plug 96 may include cooperating threads for engaging one another. Other engagement structures are contemplated.

As shown in FIG. 1, closed end 34 of exemplary canister 14 includes a projection 98 in which drain aperture 94 is defined. Second end portion of 61 of tubular member 46 defines a recess 100 configured to receive projection 98 of canister 14. According to some embodiments, projection 98 includes a tapered (e.g., substantially conical) locator 102 surrounding drain aperture 94, and second end portion 61 of tubular member 46 includes a tapered (e.g., conical) receiver 104 configured to receive locator 102, such that drain aperture 94 substantially aligns with vent passage 89 of vent tube 88 at second end portion 61 of tubular member 46. According to this exemplary configuration, fluid may be drained from filter assembly 10 by removing or disengaging drain plug 96 from drain aperture 94, so that fluid may flow from canister 14 and/or filter element 16 via drain aperture 94. Exemplary vent tube 88 permits air outside filter assembly 10 to enter at second end portion 61 of tubular member 46 and flow via vent passage 89 to first end portion 60 of tubular member 46. This, in turn, allows fluid to flow more freely from canister 14 and/or filter element 16 through drain aperture 94 and out of filter assembly 10, thereby facilitating ease of drainage of fluid from filter assembly 10, for example, when replacing filter element 16.

As shown in FIGS. 1-5 and 7, exemplary tubular member 46 includes a cover portion 106 at first end portion 60. Cover portion 106 is configured to at least partially cover (without closing outlet port 64 of tubular member 46) a longitudinal end of second chamber 58 of tubular member 46 with respect to the longitudinal direction. For example, tubular member 46 has a cross-section transverse to (e.g., perpendicular to) longitudinal axis X that includes a cross-section 108 of first chamber 56 and a cross-section 110 of second chamber 58. Exemplary cover portion 106 at least partially covers second chamber cross-section 110 with respect to the longitudinal direction.

According to some embodiments, cover portion 106 may serve as an anti-prefill device. For example, upon replacement of filter element 16, it may be desirable to prefill canister 14 and/or filter element 16 with previously used fluid from the fluid system in which filter assembly 10 is installed, for example, to prevent air pockets in the fluid system. However, because this fluid is previously used and may include undesirable particles, it is desirable for this previously used fluid to be filtered before returning to the fluid system. As previously used fluid is added to filter assembly 10 via inlet port 62 of filter element 16, exemplary cover portion 106 may serve to prevent the added fluid from entering second chamber 58 without first flowing through first chamber 56 and filter medium 48, such that particles are at least partially removed from the added fluid prior to entering second chamber 58 and returning to the fluid system following activation of the machine (e.g., starting the engine of the machine).

In the exemplary embodiment shown, cover portion 106 extends at an oblique angle β (FIG. 10) with respect to longitudinal axis X of tubular member 46. Angle β may range from about 10 degrees to about 80 degrees, from about 20 degrees to about 75 degrees, from about 30 degrees to about 60 degrees, or from about 40 degrees to about 50 degrees (e.g., about 45 degrees). Angle β may be selected based on various considerations, such as, for example, the size of inlet port 62 and/or outlet port 64 of tubular member 46. According to some embodiments (e.g., as shown), cover portion 106 extends from an end of partition 54 at oblique angle β.

Exemplary cover portion 106 includes an upper surface 112 extending at an oblique angle. According to some embodiments, the oblique angle of upper surface 112, is the same as angle β. According to some embodiments, the oblique angle of upper surface 112 differs from angle β. In the exemplary embodiments shown, upper surface 112 is configured to abut a complimentary surface of filter assembly 10, as explained in more detail herein.

As shown in FIGS. 1-3, 5, and 6, tubular member 46 includes an exterior wall 114 extending in the longitudinal direction. In the exemplary embodiment shown, outlet port 64 is defined by an outlet aperture in exterior wall 114 of tubular member 46. As shown in FIGS. 3-7, tubular member 46 includes two seals 66 (e.g., O-ring seals), with a first seal 66 extending at angle β at a remote end of first end portion 60 and a second seal 66 located at a position of tubular member 46 between first end cap 50 and outlet port 64. According to some embodiments, this exemplary seal arrangement serves to seal outlet port 64 from the rest of filter assembly 10.

Figure 10:
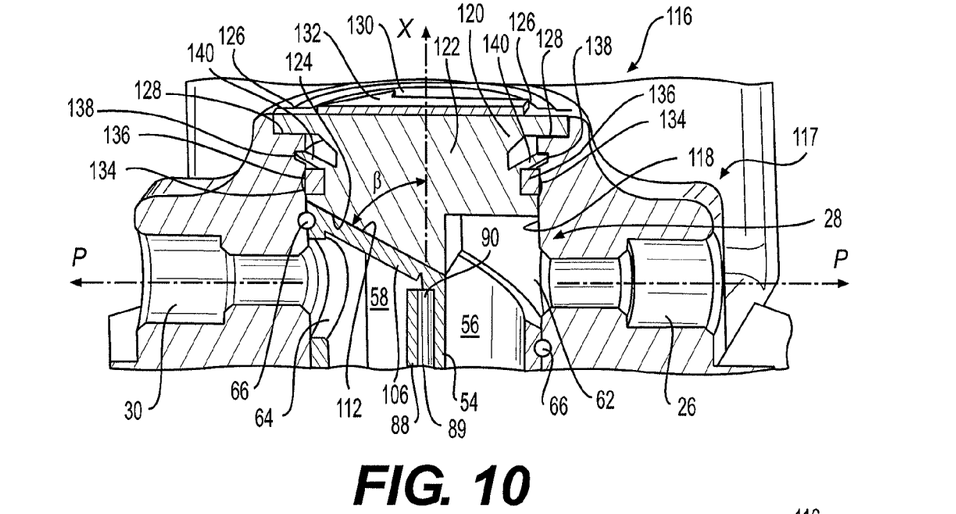
FIG. 10 is a partial perspective section view of a portion of the exemplary filter assembly shown in FIG. 1.
Figure 11:
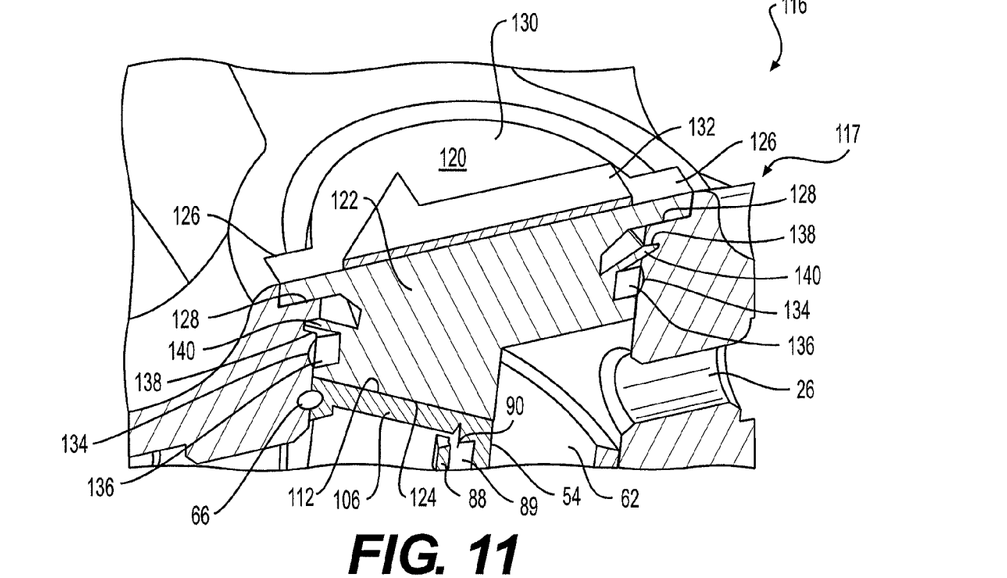
FIG. 11 is a partial perspective section view of the portion of the exemplary filter assembly shown in FIG. 10.

Referring to FIGS. 10 and 11, exemplary filter base 12 includes a filter base system 116 including a filter assembly coupler 117 (e.g., including canister coupler 24) configured to couple canister 14 and/or filter element 16 to a machine. In the exemplary embodiment shown in FIGS. 10 and 11, inlet passage 26 and outlet passage 28 of filter base 12 each define a longitudinal axis P. In the exemplary embodiment shown, longitudinal axes P are substantially co-linear. Alternatively, they may be substantially parallel without being co-linear, or they may be skewed with respect to one another.

In the exemplary embodiment shown, receiver 28 includes a receiver passage 118 configured to receive first end portion 60 of tubular member 46. Exemplary receiver passage 118 extends substantially parallel to longitudinal axis X of tubular member 46 and substantially transverse to (e.g., perpendicular to) longitudinal axes P of inlet passage 26 and outlet passage 30 of filter base 12.

As shown in FIGS. 10 and 11, filter base system 116 includes a base plug 120 configured to be received in a first end of receiver passage 118 opposite a second end of receiver passage 118 configured to receive first end portion 60 of tubular member 46 of filter element 16. Exemplary base plug 120 includes a base plug body 122 configured to provide a fluid-tight seal between base plug 120 and receiver passage 118. As shown, exemplary base plug body 122 includes a plug surface 124 configured to cooperate with upper surface 112 of cover portion 106 of tubular member 46, such that orientation of filter element 16 with respect to filter base 12 depends on orientation of base plug 120 in receiver passage 118. For example, plug surface 124 extends at an oblique angle complimentary to the angle of upper surface 112 of cover portion 106. Thus, if base plug 120 is oriented in receiver passage 118, such that plug surface 124 extends in a first direction (e.g., down and to the right as shown in FIGS. 10 and 11), then filter element 16 must be oriented with respect to filter base 12, such that upper surface 112 of cover portion 106 extends in the first direction. Alternatively, if base plug 120 is oriented in receiver 28 such that plug surface 124 extends in a second direction (e.g., down and to the left (not shown)), then filter element 16 must be oriented with respect to filter base 12, such that upper surface 112 of cover portion 106 also extends in the second direction. This exemplary configuration may serve to ensure that filter element 16 is installed in the correct orientation relative to filter base 12.

In the exemplary embodiment shown, base plug 120 includes one or more (e.g., two) locators 126 (e.g., extensions), and an upper surface of filter base 12 includes one or more locator receivers 128 (e.g., recesses) configured to receive locator(s) 126 upon receipt of base plug 120 in receiver passage 118 of filter base 12. Locator 126 and locator receiver 128 are configured to prevent improper orientation of base plug 120 with respect to filter base 12 upon receipt of base plug 120 in receiver passage 118. In the exemplary embodiment shown in FIGS. 10 and 11, filter base 12 includes two locator receivers 128, such that base plug 120 may be selectively receivable in one of two orientations relative to filter base 12. According to some embodiments, two locator receivers 128 are located opposite one another with respect to receiver passage 118. Such an exemplary configuration permits base plug 120 to be received in receiver passage 118 in one of two orientations 180 degrees from one another. As a result, plug surface 124 either extends in a first direction (e.g., down and to the right as shown in FIGS. 10 and 11), or extends in a second direction (e.g., down and to the left). As a result, filter element 16 must be oriented with respect to filter base 12, such that upper surface 112 of cover portion 106 extends in either the first direction or the second direction.

In this exemplary configuration, filter element 16 must be oriented in one of two orientations relative to filter base 12, but prevents other orientations. This may serve to ensure that filter element 16 is oriented, so that inlet port 62 is either aligned with inlet passage 26 of filter base 12 or aligned with outlet passage 30 of filter base 12. This results in filter assembly 10 being reversible with respect to the machine on which it is installed. For example, space considerations may result in supplying fluid for filtration to filter assembly 10 from one side of filter assembly 10, for example, from the right side as shown in FIGS. 1, 2, 10, and 11. In such situations, passage 26 of filter base 12 serves as an inlet passage, and passage 30 serves as an outlet passage. However, space considerations may result in supplying fluid for filtration to filter assembly 10 from the other side of filter assembly 10 (i.e., from the left side as shown in FIGS. 1, 2, 10, and 11). In such situations, passage 30 of filter base 12 serves as an inlet passage, and passage 26 serves as an outlet passage, thereby reversing the flow of fluid though filter base 12.

In order to ensure that desired filtration occurs, regardless of the direction through filter base 12 which fluid flows, filter element 16 needs to be in the proper orientation to ensure that fluid flows through filter element 16 in the desired manner (e.g., the manner set forth previously herein). Exemplary base plug 120 serves to ensure that filter element 16 is in the desired orientation. According to some embodiments, base plug 120 includes an upper surface 130 having directional indicator 132. For example, exemplary base plug 120 includes an arrow indicating the direction of fluid flow through filter base 12. As shown, directional indicator 132 and plug surface 124 cooperate, such that filter element 16 may be installed in filter base 12 in the proper orientation for the direction of fluid flow through filter base 12 indicated by directional indicator 132.

In the exemplary embodiment shown in FIGS. 10 and 11, base plug 120 includes a seal groove 136 configured to receive a seal 134 to provide a fluid-tight seal between base plug 120 and receiver passage 118. According to some embodiments, the interior surface of receiver passage 118 also includes a retainer groove 138, and base plug 120 includes a retainer projection 140 configured to be received in retainer groove 138 to retain base plug 120 in receiver passage 118. According to some embodiments, the cross-sectional shape of receiver passage 118 is substantially circular, although other cross-sectional shapes are contemplated, and base plug 120 will be configured to correspond to the cross-sectional shape of receiver passage 118.

Figure 12:
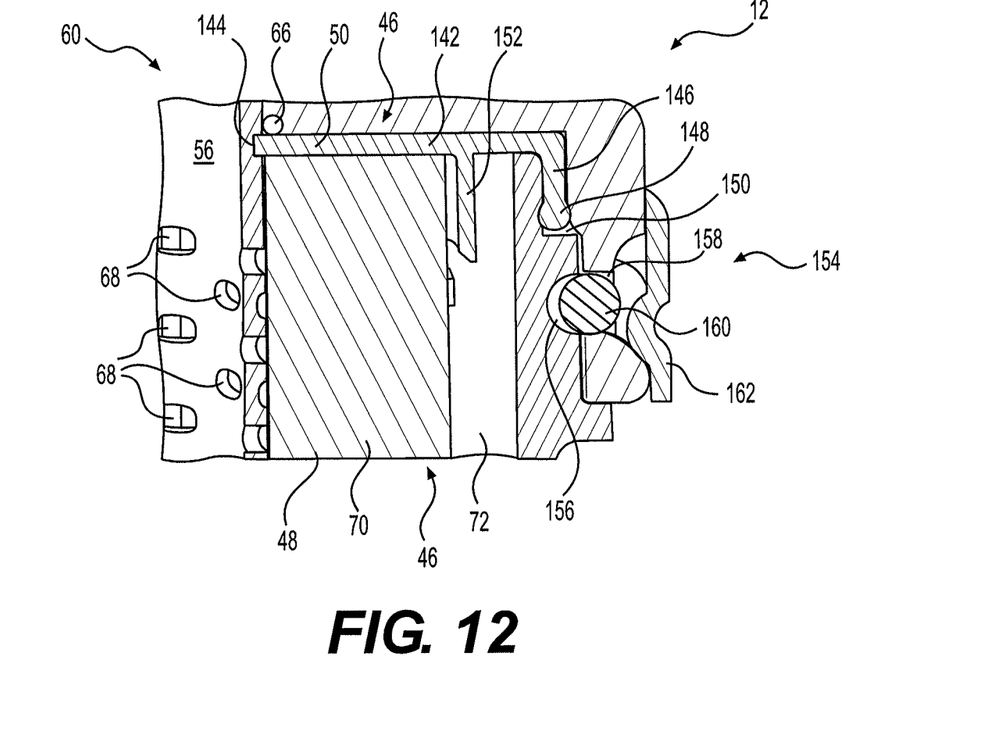
FIG. 12 is a partial side section view of a portion of the exemplary filter assembly shown in FIG. 1.

As shown in FIG. 12, exemplary first end cap 50 of filter element 16 includes a plate 142 substantially transverse to (e.g., perpendicular to) longitudinal axis X. Plate 142 includes a plate aperture 144 through which first end portion 60 of tubular member 46 extends into receiver 28 of filter base 12. Exemplary first end cap 50 also includes a sealing wall 146 coupled to plate 142 and extending substantially transverse to (e.g., perpendicular to) plate 142. As shown in FIG. 12, exemplary sealing wall 146 includes an end remote from plate 142 having an enlarged seal portion 148 configured to be compressed between an end of a wall 140 of canister 14 and an interior surface of base wall 44 of filter base 12 to provide a fluid-tight seal between canister 14 and filter base 12. According to the exemplary embodiment shown, plate 142 is circular, and sealing wall 146 is an annular wall extending around the periphery of plate 142. Sealing wall 146 and/or seal portion 148 may be formed from a material that provides a fluid seal, such as, for example, elastically-deformable polymer materials known to those skilled in the art.

In the exemplary configuration shown, compression of seal portion 148 is radial rather than longitudinal (e.g., solely radial). Because, according to some embodiments, the radial orientation of filter element 16 with respect filter base 12 is fixed, depending on the direction fluid flows through filter base 12, filter element 16 does not spin with respect to filter base 12. As a result, filter element 16 is not tightened with respect to filter base 12 by being spun onto threads, which would compress a seal in a longitudinal manner. Rather, in the exemplary configuration shown, canister 14 and filter element 16 within canister 14 are pushed longitudinally up into housing 40 of filter base 12. Sealing wall 146 and/or seal portion 148 extend around an end portion of canister wall 140, and canister 14 and filter element 16 slide longitudinally into housing 40, with sealing wall 146 and seal portion 148 being received in a pocket 150 created between the end of wall 140 of canister 14 and the interior surface of base wall 44 of filter base 12. Thereafter, a securing mechanism may be used to secure canister 14 and filter element 16 in the assembled position with respect to filter base 12, as explained below.

Exemplary first end cap 50 also includes a retainer wall 152 coupled to and extending substantially transverse to (e.g., parallel to) plate 142. As shown, exemplary retainer wall 152 may serve to locate and retain filter medium 48 in filter element 16.

According to some embodiments, the cross-sectional shape of filter base 12, canister 14, and/or filter element 16 is substantially circular, and sealing wall 146 and retainer wall 152 form annular walls. According to some embodiments, filter base 12, canister 14, and/or filter element 16 have a cross-sectional shape other than circular, such as, for example, substantially oval-shaped or substantially polygonal, and sealing wall 146 and retainer wall 152 have corresponding configurations.

As shown in FIGS. 1, 2, and 12, exemplary filter assembly 10 includes a retainer mechanism 154 configured to secure canister 14 and filter element 16 to filter base 12. In the exemplary embodiment shown, canister wall 140 includes a canister groove 156, and base wall 44 of filter base 12 includes a housing groove 158. Exemplary retainer mechanism 154 further includes a retainer strip 160 configured to be received in canister groove 156 and housing groove 158 upon alignment of canister groove 156 with housing groove 158, to thereby retain canister 14 in housing 40 of filter base 12, with seal portion 148 radially compressed in pocket 150. Exemplary retainer mechanism 154 also includes an exterior band 162 that covers retainer strip 160.

INDUSTRIAL APPLICABILITY

The filter assembly of the present disclosure may be useful for filtering fluids for a variety of machines including power systems, coolant systems, hydraulic systems, and/or air handling systems. Referring to FIG. 1, a supply of fluid may be supplied to filter assembly 10 via a fluid conduit, filtered via filter assembly 10, and recirculated into the fluid system via a conduit.

For example, as shown in FIG. 1, fluid enters filter assembly 10 via inlet passage 26 of filter base 12. The fluid flows from inlet passage 26 into inlet port 62 and into first chamber 56. Thereafter, fluid flows out of at least one outlet aperture 68, through first portion 70 of filter medium 48, and into canister 14, thereby subjecting the fluid to a first filtration process. Thereafter, the fluid flows around filter element 16 and enters second chamber 58 by passing through second portion 76 of filter medium 48 and at least one inlet aperture 74, thereby subjecting the fluid to a second filtration process. Thereafter, the fluid flows from second chamber 58 to outlet port 64, and exits filter element 16 via outlet passage 30 of filter base 12.

According to some embodiments, plate 142 of first end cap 50 includes a sealing wall 146 coupled to plate 142 and extending substantially transverse to (e.g., perpendicular to) plate 142. Exemplary sealing wall 146 includes an end remote from plate 142 having an enlarged seal portion 148 configured to be compressed between an end of a wall 140 of canister 14 and an interior surface of base wall 44 of filter base 12 to provide a fluid-tight seal between canister 14 and filter base 12. According to the exemplary embodiment shown, plate 142 is circular, and sealing wall 146 is an annular wall extending around the periphery of plate 142.

In this exemplary configuration, compression of seal portion 148 is transverse to the longitudinal axis X rather than in the longitudinal direction. For example, the compression may be solely radial. Because, according to some embodiments, the radial orientation of filter element 16 with respect filter base 12 is fixed, filter element 16 does not spin with respect to filter base 12. As a result, filter element 16 is not tightened with respect to filter base 12 by being spun onto threads, which would compress a seal in a longitudinal direction. Rather, in the exemplary configuration shown, canister 14 and filter element 16 within canister 14 are pushed longitudinally up into housing 40 of filter base 12. Sealing wall 146 and/or seal portion 148 extend around an end portion of canister wall 140, and canister 14 and filter element 16 slide longitudinally into housing 40, with sealing wall 146 and seal portion 148 being received in a pocket 150 created between the end of wall 140 of canister 14 and the interior surface of base wall 44 of filter base 12.

This exemplary configuration of first end cap 50 provides a sufficient fluid-tight seal between filter base 12, canister 14, and filter element 16, even though canister 14 and filter element 16 are not installed on filter base 12 by being spun onto filter base 12. In addition, because for at least some embodiments, first end cap 50 is a part of filter element 16, it is difficult to assemble filter base 12, canister 14, and filter element 16 to one another without also installing seal portion 148. This may prevent unintentional failure to include a seal upon servicing of filter assembly 10.

In addition, filter assembly 10 may include retainer mechanism 154, which is configured to secure canister 14 and filter element 16 to filter base 12. Exemplary retainer strip 160 may be received in canister groove 156 and housing groove 158 upon alignment of canister groove 156 with housing groove 158, to thereby retain canister 14 in housing 40 of filter base 12, with seal portion 148 radially compressed in pocket 150. In this exemplary manner, retainer mechanism 154 may quickly and securely couple canister 14 and filter element 16 to filter base 12. In order to disassemble canister 14 and filter element 16 from filter base 12, retainer strip 160 may be removed from canister groove 156 and housing groove 158, thereby enabling disengagement of canister 14 and filter element 16 from filter base 12.

It will be apparent to those skilled in the art that various modifications and variations can be made to the disclosed, exemplary filter assemblies. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter element comprising:
   a tubular member having a longitudinal axis and including an end portion at least partially defining an inlet port configured to provide flow communication to a filter medium of the filter element, and at least partially defining an outlet port configured to provide flow communication from the filter medium, wherein the filter medium is configured to filter particles from fluid passing through the filter medium; and an end cap associated with the end portion of the tubular member and the filter medium, the end cap including:

a plate transverse to the longitudinal axis of the tubular member, the plate having an end cap aperture through which the end portion of the tubular member is received; and a sealing wall coupled to the plate and extending transverse to the plate and in the same axial direction as the filter medium, the sealing wall configured to be received around and engaged with an outer peripheral surface of an end portion of a canister wall of a filter canister, the sealing wall further including a seal portion configured to be compressed between the filter canister and a portion of a filter base to provide a seal between the filter canister and the portion of the filter base, wherein the filter element is configured such that fluid passing through the filter element from the inlet port to the outlet port passes through the filter medium.

2. The filter element of claim 1, further including a retainer wall coupled to and extending transverse to the plate of the end cap, the retainer wall being located between the end cap aperture and the sealing wall and positioned radially outward of the filter medium.

3. The filter element of claim 2, wherein the plate is substantially circular and the sealing wall is an annular wall.

4. The filter element of claim 1, wherein the seal portion is configured to be compressed in a direction transverse to the longitudinal axis of the tubular member.

5. The filter element of claim 1, wherein the plate is substantially circular and the sealing wall is an annular wall, and wherein the seal portion is configured to be compressed in a radial direction.

6. The filter element of claim 1, wherein the seal portion is formed from an elastically-deformable material.

7. The filter element of claim 1, wherein the seal portion has a cross-section and the sealing wall has a thickness, and wherein the cross-section of the seal portion has a width greater than the width of the sealing wall.

8. A filter element comprising:

a tubular member having a longitudinal axis and including an end portion at least partially defining an inlet port configured to provide flow communication to a filter medium of the filter element, and at least partially defining an outlet port configured to provide flow communication from the filter medium, wherein the filter medium is configured to filter particles from fluid passing through the filter medium; and an end cap associated with the end portion of the tubular member and the filter medium, the end cap including:

a plate transverse to the longitudinal axis of the tubular member, the plate having an end cap aperture through which the end portion of the tubular member is received; and a sealing wall coupled to the plate and extending transverse to the plate and in the same axial direction as the filter medium, the sealing wall configured to be received around and engaged with an outer peripheral surface of an end portion of a canister wall of a filter canister, the sealing wall further including a seal portion configured to be compressed between the filter canister and a portion of a filter base in a direction transverse to the longitudinal axis of the tubular member to provide a seal between the filter canister and the portion of the filter base, wherein the filter element is configured such that fluid passing through the filter element from the inlet port to the outlet port passes through the filter medium.

9. The filter element of claim 8, wherein the plate is substantially circular and the sealing wall is an annular wall, and wherein the seal portion is configured to be compressed between the filter canister and the portion of the filter base in a radial direction.

10. A filter assembly comprising:

a filter base configured to be coupled to a machine;

a filter canister having an open end, a closed end, and being configured to be coupled to the filter base; and a filter element configured to be received in the canister, the filter element including:

a tubular member having a longitudinal axis and including an end portion at least partially defining an inlet port and at least partially defining an outlet port;

a filter medium associated with the tubular element and configured to filter particles from fluid passing through the filter medium; and an end cap associated with the end portion of the tubular member and the filter medium, the end cap including:

a plate transverse to the longitudinal axis of the tubular member, the plate having an end cap aperture through which the end portion of the tubular member is received; and a sealing wall coupled to the plate and extending transverse to the plate toward the closed end of the filter canister, the sealing wall received around and engaged with an outer peripheral surface of the open end of the filter canister and including a seal portion configured to be compressed between the filter canister and a portion of the filter base to provide a seal between the filter canister and the portion of the filter base, wherein the filter element is configured such that fluid passing through the filter element from the inlet port to the outlet port passes through the filter medium.

11. The filter assembly of claim 10, wherein the filter canister and the filter base are configured to form a pocket upon assembly, and wherein the seal portion is received in the pocket and compressed between the filter canister and the portion of the filter base in the pocket to provide the seal between the filter canister and the portion of the filter base.

12. The filter assembly of claim 10, further including a retainer wall coupled to and extending transverse to the plate of the end cap, the retainer wall being located between the end cap aperture and the sealing wall and positioned radially outward of the filter medium.

13. The filter assembly of claim 12, wherein the plate is substantially circular and the sealing wall is an annular wall.

14. The filter assembly of claim 10, wherein the seal portion is configured to be compressed in a direction transverse to the longitudinal axis of the tubular member.

15. The filter assembly of claim 10, wherein the plate is substantially circular and the sealing wall is an annular wall, and wherein the seal portion is configured to be compressed between the filter canister and the portion of the filter base in a radial direction.

16. The filter assembly of claim 10, wherein the seal portion is formed from an elastically-deformable material.

17. The filter assembly of claim 10, wherein the seal portion has a cross-section and the sealing wall has a thickness, and wherein the cross-section of the seal portion has a width greater than the width of the sealing wall.

18. The filter assembly of claim 10, further including a retainer mechanism configured to secure the filter canister to the filter base such that seal portion is compressed.

19. The filter assembly of claim 18, wherein the retainer mechanism includes retainer strip configured to be received in a groove of the filter canister.

20. The filter assembly of claim 19, wherein the retainer strip is configured to be received in a groove of the filter base.

* * * * *